United States Patent [19]
Majkrzak

[11] Patent Number: 4,651,511
[45] Date of Patent: Mar. 24, 1987

[54] MOWER ASSEMBLY

[75] Inventor: David S. Majkrzak, West Fargo, N. Dak.

[73] Assignee: Crary Company, Fargo, N. Dak.

[21] Appl. No.: 859,870

[22] Filed: May 2, 1986

Related U.S. Application Data

[63] Continuation of Ser. No. 756,591, Jul. 19, 1985, abandoned.

[51] Int. Cl.⁴ ............................................. A01D 55/06
[52] U.S. Cl. ....................................... 56/310; 56/311
[58] Field of Search ................. 56/310, 311, 308, 307, 56/296

[56] References Cited

U.S. PATENT DOCUMENTS

| | | | |
|---|---|---|---|
| 209,465 | 10/1878 | Curtis | 56/310 |
| 782,006 | 2/1905 | Coe | 56/308 |
| 999,291 | 8/1911 | Bader | 56/311 |
| 1,581,214 | 4/1926 | Kelley | 56/310 |
| 2,226,583 | 12/1940 | Ronning | 56/308 |
| 2,529,087 | 11/1950 | Leake | 56/310 |
| 2,619,787 | 12/1952 | Mills et al. | 56/310 |
| 3,146,570 | 9/1964 | Otten | 56/311 |
| 3,171,242 | 3/1965 | Scarnato et al. | 56/310 |
| 3,401,513 | 9/1968 | Rickerd | 56/298 |
| 3,553,948 | 1/1971 | White | 56/307 |
| 3,566,592 | 3/1971 | Jerman et al. | 56/311 |
| 3,978,645 | 9/1976 | Bennett et al. | 56/310 |
| 4,520,618 | 6/1985 | Sorensen et al. | 56/310 |
| 4,530,204 | 7/1985 | Brooks | 56/298 |

OTHER PUBLICATIONS

Heavy-duty Buchanan Sickle Guards, Bulletin #107, 284D, National-Standard Forged Products Division, Buchanan, Michigan, 10/82.
Leaflet on "Tiger Jaws" by Herschel Corporation, Indianola, Iowa, 1980.
Leaflet on "Filler Guards" by Crary Corporation, Fargo, North Dakota, 3/84.

*Primary Examiner*—Gene Mancene
*Assistant Examiner*—John G. Weiss
*Attorney, Agent, or Firm*—Kinney & Lange

[57] ABSTRACT

A mower assembly in which a standard sickle guard having two long fingers is replaced with a guard having two long fingers and two alternate fingers that are relatively short. The sickle blade cooperates with cutting surfaces on both the long and the short fingers. In the case of the long fingers, there are slots through which the sickle bar moves. In the case of the short fingers, the blade merely moves over a cutting surface of the short finger. There are trash bars extending between the fingers to strengthen the fingers and guard against rocks or uncut plants jamming the space between the fingers.

The guard unit is fastened at two points to the guard support bar so as to minimize any tendency of the guard unit to turn.

5 Claims, 4 Drawing Figures

MOWER ASSEMBLY

This application is a continuation of application Ser. No. 756,591, filed July 19, 1985 now abandoned.

BACKGROUND OF THE INVENTION

1. Field of the Invention

The present invention pertains to a mower assembly and particularly one employing an improved sickle guard to provide greater cutting action.

The standard sickle guard provides for a spacing between the sickle guard fingers which is equal to the spacing between the teeth of the sickle bar. Customarily, this is a 3-inch spacing. There is also a standard 3-inch stroke so that each tooth alternately moves betwen two sickle guard fingers. The movement of the single tooth against the sickle guard finger creates a shearing action. The sickle guard finger functions both to provide for the shearing action and also to support and protect the sickle blade as it moves back and forth.

The problem with the standard sickle guard is that a standard stroke equal to the spacing between the fingers slows down the machine and results in considerable shattering of the plants, resulting in substantial shatter loss. In other words, there is so much movement of the blades that the plants are hit sidewise, without cutting them, as the blade moves from one sickle guard finger to the next sickle guard finger.

2. Description of Prior Art

There have been various attempts to solve this problem. One of them involves placing twice as many sickle guard fingers on the sickle guard support. A typical sickle guard finger has a rearwardly facing slot through which the sickle bar moves. The problem with this is that the tight fit due to increased number of sickle guard fingers tends to result in binding problems in wet conditions. Furthermore, these extra fingers create more pushing problems in certain crops and large weeds. The additional finger sections are also very prone to breakage.

The Ronning U.S. Pat. No. 2,226,583 employs two fingers for each sickle guard section. One of these is a full sickle guard finger with a rearwardly facing slot, and the other one is a short finger which does engage the cutter blade in cutting engagement, but which does not support it by the use of a rearwardly facing slot, as is the case with the long fingers. While the arrangement of Ronning increases the number of cuts per stroke of the sickle and decreases the pushing problems that arise when twice as many long fingers are employed, the Ronning arrangement has certain drawbacks. In the first place, it is mounted on a vertically disposed flange. This is not a very satisfactory design for low height cutting as is required for a crop like soybeans. Furthermore, the individual teeth extend directly from the cross support bars and do not have any reinforcement. In additon, each tooth section is fastened by merely one fastener. This can result in the guard sections tilting slightly, causing alignment problems.

The Curtis U.S. Pat. No. 209,465 shows an arrangement in which there are a plurality of sections, each of which contains one long guard finger and one short one. It does use vertical bolts, unlike Ronning. On the other hand, there is only one bolt per section so that there would be a tendency for the sections to tip sidewise. Furthermore, in order to get four fingers, it is necessary to use two sections. There is no reinforcement for the guards and there would be a tendency for trash to collect between the various guard fingers.

The U.S. Patent to Kelley U.S. Pat. No. 1,581,214 shows an arrangement employing long and short fingers. There apparently is no contact with the knife with the short fingers. Also, there is only one long finger and one short finger for each guard section.

SUMMARY OF THE INVENTION

The present invention is concerned with a mower assembly in which there is a sickle bar having a pluraity of uniformly spaced teeth mounted for horizontal reciprocation and means for guiding the sickle bar during its reciprocation, this means including a plurality of guard sections, each including at least four guard fingers in cutting engagement with the sickle bar. The alternate guard fingers are relatively long and include rearwardly facing slots through which the sickle bar moves. The other guard fingers are relatively short and extend forwardly substantially the same distance as the tip of the teeth of the sickle bar. Each guard section is fastened at spaced points to the guard support bar so as to minimize any tendency of the guard section to turn with respect to the support bar.

The mower assembly preferably has trash guard bars extending parallel to the support bar between the guard fingers. These trash guard bars are rigidly secured to the adjacent guard fingers at an area adjacent the base of the teeth of the sickle bar. These trash guards reinforce the guard fingers and minimize the tendency of trash to collect between the teeth.

The support bar is parallel to the plane of the sickle bar and the guard sections are secured to the top of the support bar. The fastening means for securing the guard sections to the support bar are preferably each disposed on a center line extending longitudinally through an adjacent guard finger.

Other features and objects of the invention will be apparent from a consideration of the accompanying specification, claims and drawing.

DETAILED DESCRIPTION OF THE PREFERRED EMBODIMENTS

Figure 1:
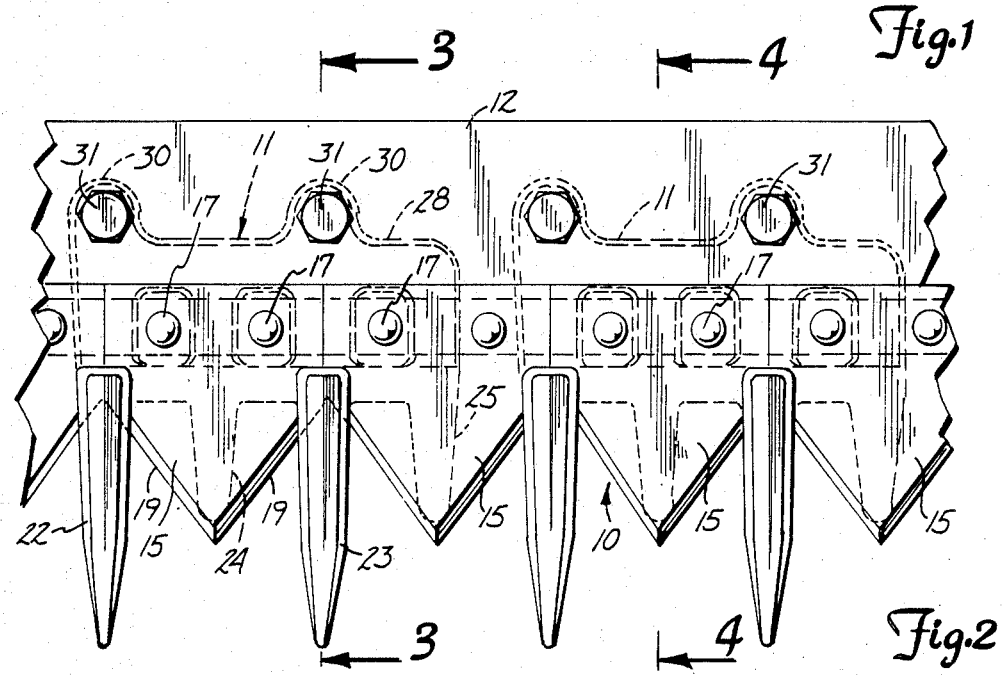
FIG. 1 is a top plan view of the mower assembly of the present invention.

Referring to the drawings, the reference numeral 10 is used to generally indicate a sickle bar. This sickle bar, which will be described in more detail later, cooperates with a plurality of guard sections 11 which are secured to a guard support bar 12 running longitudinally of the sickle bar.

Referring to the sickle bar 10, this is a conventional type of sickle bar comprising a plurality of knife sections 15 secured to the upper surface of a bar 16 by rivets 17 or other suitable fastening means. Each knife section 15 is generally identical and is formed of a relatively thin member having forwardly converging sides. The opposite faces of each knife section are beveled to form cutting edges 19. The sickle bar 10 is supported to a large extent by the guard sections 11, as will be presently described, and is actuated by conventional actuating means (not shown) so as to reciprocate back and forth.

Figure 2:
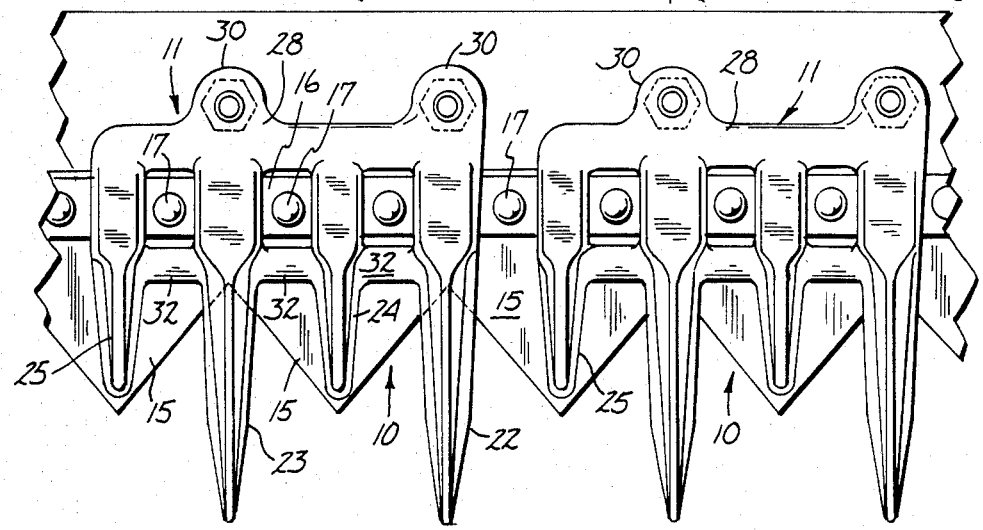
FIG. 2 is a bottom plan view of the mower assembly.
Figure 3:
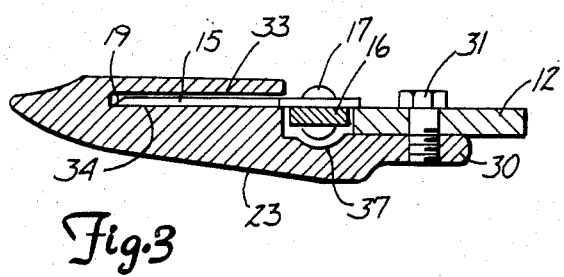
FIG. 3 is a sectional view taken along the line 3—3 of FIG. 1.

Referring to the guard sections 11, each of these comprises two long fingers 22 and 23 and two short fingers 24 and 25. All of the four fingers are secured to a crossbar 28, as best shown in FIG. 2, preferably being integral therewith. Crossbar 28 is provided with two spaced ears 30. These are secured to the guard support bar 12 by cap screws 31, as best shown in FIG. 3. The cap screws extend through the guard support bar 12 into the ear portions 30 of the crossbar 28. By having two separate fasteners 31 for each guard section, the guard section is held firmly against any tendency to turn, as is the case where each guard section is fastened to the support guard by only one fastening means.

Extending between the fingers are trash bars 32. Each trash bar is rigidly secured to the adjacent guard sections, as best shown in FIG. 2. Normally, these trash bar sections are integral with the adjacent guard fingers. The trash bars 32 serve to reinforce the fingers 22, 23, 24 and 25. Furthermore, they prevent trash from jamming between the various guard fingers, as would be the case if they were not present. It will be noted that the trash bars are adjacent of the base of the inclined cutting edges 19 of the sickle bar sections 15.

Referring now to the manner in which the cutting action works, the long guard fingers 23 are each provided with a slot 33, as best shown in FIG. 3. The knife sections 15 of the sickle blade move back and forth through this slot. The finger 23 is provided at the base of the slot 33 with a cutting surface 34 with which the cutting edges 19 of the sickle blade sections 15 cooperate. As the blade 15 moves back and forth, the cutting edges 19 cooperate with the cutting surface 14 to provide a shearing action.

Referring now to the short fingers 24 and 25, the finger does not have a slot through which the sickle blade 15 moves. On the other hand, it does have a shearing or cutting surface 35 which cooperates with the cutting edges 19 of the blade to produce a shearing action. Thus, shearing takes place both in connection with the long fingers 22 and 23 and the short fingers 24 and 25.

Figure 4:
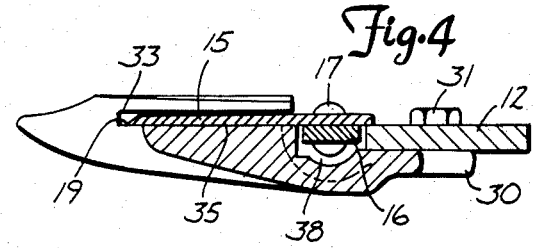
FIG. 4 is a sectional view taken along the line 4—4 of FIG. 1.

As is best seen in FIGS. 2 and 4, the tips of the knife sections 15 extend forwardly beyond the forward ends of the short fingers 24 and 25. This has the advantage that any plant approaching a short finger is moved sidewise into cutting engagement with the blade either as it moves along the short finger or moves along an adjacent long finger. This minimizes any tendency of the plants to jam up between the fingers, as happens when the blade does not extend beyond the forward end of the short fingers.

The long fingers 22 and 23 are provided with grooves 37 and the short fingers 24 and 25 are provided with similar grooves 38. The grooves 37 and 38 collectively provide a channel through which the sickle bar 16 and the rivets 17 can move without obstruction.

OPERATION

Referring now to the operation of the entire mowing assembly, and referring specifically to FIG. 2, the sickle bar 10 moves back and forth the distance between the long finger 22 and the long finger 23. The blades 15 are shown in the drawing in the center portion of their stroke. Thus, for each stroke in one direction, the sickle blade 15 moves in shearing engagement with the shearing surface 34 of the long finger 23, into shearing engagement with the short finger 24 and then into shearing engagement with the other long finger 22. Thus, for each stroke of the sickle bar, the sickle blade comes into contact with the shearing surfaces of three guard fingers. This produces twice as much shearing effect as is normally the case with the conventional mower assembly.

Because of half of the fingers being short fingers, there is much less resistance to the movement of the mower bar through the material being mowed. Where all of the fingers are long fingers, there is considerable resistance to movement of the sickle bar. Furthermore, because of the alternate fingers being short, any tendency for rocks to jam between the fingers is minimized.

The trash bars 32 serve several functions. In the first place, they greatly minimize the tendency of rocks or plants to become jammed between the fingers. Since the trash bars are adjacent the junction of the cutting edges of the sickle blades, they do not appreciably affect the cutting action. Moreover, they greatly reinforce the fingers 22 through 25 in that they form a rigid connection between the fingers well forward of the crossbar 28.

It is to be pointed out that the guard sections 11 customarily have the same spacing of the ears 30 as with the conventional type of guard section in which there are two long fingers for each guard section. All that it is necessary to do to convert to the present device is to remove the standard guard sections and secure the new guard sections, thus doubling the cutting action and minimizing the shatter loss due to the long distance that the cutting blade must travel between the guard fingers. With the present arrangement, the tendency to shatter is greatly reduced.

While I have shown an arrangement in which any one blade cooperates with three guard fingers, it is to be understood that, if desired, there can be twice as many blades so that there is one blade for each guard finger, the length of the stroke being the same. This gives the advantage of twice as much cutting action.

While I have shown certain specific embodiments for purposes of illustration, it is to be understood that the scope of the invention is limited solely by that of the appended claims.

What is claimed is:

1. A mower assembly comprising:
   a support bar;
   a sickle bar having a plurality of uniformly spaced teeth, said sickle bar being mounted for horizontal reciprocation; and
   means for mounting said sickle bar during its reciprocation, said means including a plurality of unitary guard sections, each including at least four guard fingers in cutting engagement with the sickle bar and including first guard fingers and second guard fingers, the first guard fingers extending substantially forwardly from the tips of the teeth of the sickle bar and having rearwardly facing slots therein through which the sickle bar moves, the second guard fingers being disposed alternately between said first guard fingers in sliding engagement with the sickle bar, said second fingers being relatively short so as to extend forwardly substantially the same distance but less than the tip of the teeth of the sickle bar so that the tips of the sickle bars extend beyond the extremeties of the second fingers, and fastening means securing each guard section to the support bar, said fastening means including longitudinally spaced fastening members for securing each guard section to the support bar at spaced points to minimize any tendency of the guard sections to turn with respect to the support bar.

2. The mower assembly of claim 1 in which trash guard bars extend longitudinally of the support bar between the guard fingers, each trash guard bar being integrally secured to each adjacent guard finger at an area adjacent the bases of the teeth of the sickle bar.

3. The mower assembly of claim 1 in which the support bar is parallel to the plane of the sickle bar and the guard sections are secured to the top of the support bar.

4. The mower assembly of claim 1 in which the fastening members for fastening the guard sections to the support bar are each disposed adjacent a center line extending longitudinally through an adjacent first guard finger.

5. The mower assembly of claim 1 in which there is one each of the first guard fingers and the second guard fingers for each tooth of the sickle bar.

* * * * *